(12) United States Patent
Sano

(10) Patent No.: US 8,052,118 B2
(45) Date of Patent: Nov. 8, 2011

(54) PASSAGE CONTROL DEVICE

(75) Inventor: Ryo Sano, Kariya (JP)

(73) Assignee: Denso Corporation, Kariya (JP)

( * ) Notice: Subject to any disclaimer, the term of this patent is extended or adjusted under 35 U.S.C. 154(b) by 576 days.

(21) Appl. No.: 12/276,601

(22) Filed: Nov. 24, 2008

(65) Prior Publication Data
US 2009/0133255 A1 May 28, 2009

(30) Foreign Application Priority Data
Nov. 28, 2007 (JP) ................. 2007-307392

(51) Int. Cl.
*F16K 1/22* (2006.01)
(52) U.S. Cl. ...................................... 251/308
(58) Field of Classification Search .............. 251/304, 251/305, 308
See application file for complete search history.

(56) References Cited

U.S. PATENT DOCUMENTS

| | | | | |
|---|---|---|---|---|
| 5,255,891 A | * | 10/1993 | Pearson et al. ........... | 251/129.11 |
| 6,446,934 B2 | * | 9/2002 | Bonomi ................... | 251/306 |
| 6,763,802 B1 | * | 7/2004 | Brassell .................. | 123/336 |
| 7,219,652 B2 | * | 5/2007 | Ino et al. ................. | 123/337 |
| 2007/0063164 A1 | | 3/2007 | Torii et al. | |

FOREIGN PATENT DOCUMENTS

| | | |
|---|---|---|
| JP | 07-167309 | 7/1995 |
| JP | 2002-317718 | 10/2002 |
| JP | 2007-239647 | 9/2007 |

OTHER PUBLICATIONS

Japanese Office Action dated Jul. 27, 2009, issued in corresponding JP Application No. 2007-307392, with English translation.

* cited by examiner

*Primary Examiner* — John Fox
(74) *Attorney, Agent, or Firm* — Nixon & Vanderhye PC

(57) ABSTRACT

A passage intake control device includes a passage member, a valve disposed in the passage member and a shaft passing through a through hole of a valve shaft part of the valve. The valve shaft part includes a fitting hole portion as a part of the through hole. The fitting hole portion is provided by at least a first wall, a second wall, a third wall and a fourth wall. The shaft includes a fitting part having a polygonal shape including at least a first shaft surface a second shaft surface, a third shaft surface and a fourth shaft surface. The fitting part is fitted in the fitting hole portion such that the first to fourth shaft surfaces are opposed to the first to fourth walls of the fitting hole portion, respectively. The first and second walls have protruded ribs. The third and fourth walls include flat portions.

10 Claims, 4 Drawing Sheets

FIG. 2A
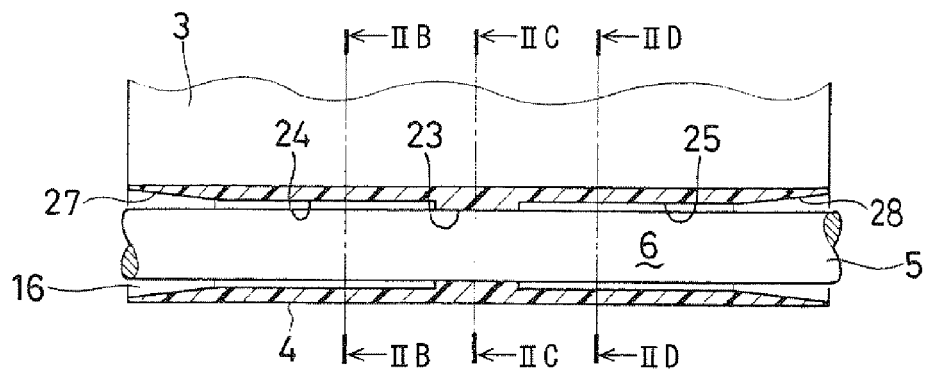
FIG. 2B  FIG. 2C  FIG. 2D
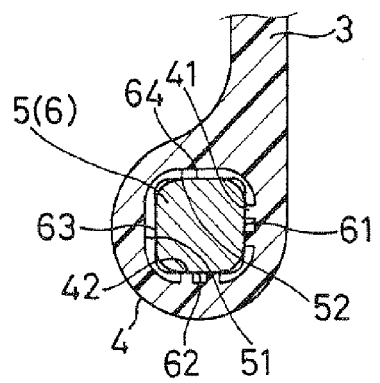 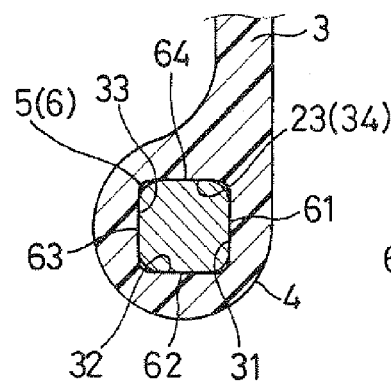 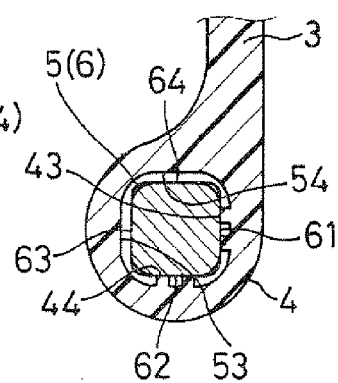

PASSAGE CONTROL DEVICE

CROSS REFERENCE TO RELATED APPLICATION

This application is based on Japanese Patent Application No. 2007-307392 filed on Nov. 28, 2007, the disclosure of which is incorporated herein by reference.

FIELD OF THE INVENTION

The present invention relates to a passage control device, which is, for example, used for an intake control device for an internal combustion engine.

BACKGROUND OF THE INVENTION

As an example of a passage control device, there is an intake vortex flow generator for an internal combustion engine. The intake vortex flow generator generates an intake vortex flow in the combustion chambers of the internal combustion engine by reducing the sectional areas of intake passages through which intake air flows.

For example, Japanese Unexamined Patent Application Publication No. 2007-085191 describes an intake vortex flow generator designed for improving the combustion efficiency by generating an intake vortex flow such as a swirling flow or a tumbling flow of the mixture in the combustion chambers of the internal combustion engine.

The intake vortex flow generator includes an intake manifold (casing) that connects to intake ports of the internal combustion engine, valve units held in the intake manifold, and a shaft supporting valves of the valve units and driven by an actuator.

Referring to FIGS. 4A and 4B, each valve unit includes a tubular housing 101 held in the intake manifold and a valve 103 disposed in the housing 101. The housing 101 has a rectangular cross-section and forms an intake passage 102 therein. The valve 103 is held in the housing 101 to open and close the intake passage 102. The valve 103 includes a vale body part and a cylindrical valve shaft part 104. The valve shaft part 104 is integrally formed with the valve body part of the valve 103.

In order to smoothly operate the valve 103 in the housing 101, that is, in order to restrict interference between the housing 101 and the valve 103, predetermined gaps must be provided between inner surfaces of the housing 101, which forms the intake passage 102, and the upper and lower, and right and left edge surfaces of the valve 103.

Further, both axial ends of the valve shaft part 104 are rotatably held inside of through holes of the housing 101. The valve shaft part 104 has a through hole therein for allowing a shaft to pass through. Particularly, the valve shaft part 104 includes a square fitting hole 105 in which the shaft will be press-fitted near the central portion of the through hole, as well as circular insertion holes 111 and 112 having a diameter larger than the outer diameter of the shaft on opposite sides of the fitting hole 105.

The shaft has a fitting portion 106 having a polygonal shape in a cross section defined perpendicular to a longitudinal axis of the shaft. The fitting portion 106 is fitted in the fitting hole 105 by press-inserting or press-fitting.

In such a configuration, the fitting portion 106 of the shaft is press-fitted and fixed to the wall surfaces of the fitting hole 105. Here, the fitting hole 105 has the inner diameter smaller than the outer diameter of the fitting portion 106 of the shaft, and is formed over the whole width of the valve body part of the valve 103. Therefore, a press-fitting load at the time of inserting the shaft in a pressed manner is large. Thus, the valve body part, the valve shaft part 104 or the fitting portion 106 of the shaft will be unexpectedly deformed at the time of inserting the shaft in a pressed manner.

For example, it can be contrived to shorten the length of a fitting part between the fitting hole 105 of the valve shaft part 104 and the fitting portion 106 of the shaft in an attempt to decrease the press-fitting load at the time of press-fitting the shaft. In such a configuration, however, there is a probability in that the shaft may be press-fitted in the wall surfaces of the fitting hole 105 in a state where the longitudinal axis of the shaft is tilted relative to a longitudinal axis of the through hole of the valve shaft part 104.

If the shaft is tilted relative to the longitudinal axis of the fitting hole 105, the gap is not properly formed between the housing 101 and the valve 103. Therefore, interference will occur between the housing 101 and the valve 103, causing malfunction of the valve 103 such as locking of the valve 103.

SUMMARY OF THE INVENTION

The present invention is made in view of the foregoing matter, and it is an object of the present invention to provide a passage control device capable of suppressing unexpected deformation of a valve and a shaft at the time of inserting the shaft into a through hole of the valve. It is a further object of the present invention to provide a passage control device capable of restricting malfunctions of the valve, such as valve lock.

According to a first aspect of the invention, a passage control device includes a passage member, a valve and a shaft. The passage member forms a fluid passage therein through which a fluid flows. The valve is disposed in the passage member to open and close the fluid passage. The valve includes a valve shaft part and a valve body part integrated with the valve shaft part. The valve shaft part has a through hole therein. The shaft passes through the through hole of the valve shaft part and is capable of varying an opening degree of the valve. The valve shaft part includes a fitting hole portion as a part of the through hole. The fitting hole portion is provided by at least a first wall, a second wall, a third wall and a fourth wall. The shaft includes a fitting part having a polygonal shape including at least a first shaft surface, a second shaft surface, a third shaft surface and a fourth shaft surface. The fitting part is fitted in the fitting hole portion of the valve shaft part such that the first shaft surface, the second shaft surface, the third shaft surface and the fourth shaft surface are opposed to the first wall, the second wall, the third wall and the fourth wall of the fitting hole portion, respectively. The first wall and the second wall of the fitting hole portion have protruded ribs each extending in a longitudinal direction of the shaft. Each of the third wall and the fourth wall of the fitting hole portion includes a flat portion.

When inserting the shaft into the through hole of the valve shaft part of the valve, the fitting part of the shaft is press-fitted in the fitting hole portion provided by at least the first to fourth walls.

In a case where the surface pressures at the contact portions between at least the first and second walls of the fitting hole portion and the first and second shaft surfaces of the fitting part of the shaft, that is, between at least the top surfaces of the protruded ribs of the fitting hole portion and the first and second shaft surfaces of the fitting part are large, the first and second walls of the fitting hole portion, that is, the top surfaces of the protruded ribs are deformed or crushed. Therefore, it is possible to restrict an increase in the surface pressures at the contact portions between the first and second walls of the fitting hole portion and the first and second shaft surfaces of the fitting part. As such, the press-fitting load can be decreased at the time of press-fitting. Further, unexpected deformation and cracking of the valve and shaft are reduced when press-fitting the shaft into the valve shaft part of the valve.

The valve shaft part has the protruded ribs on the first and second walls, and the protruded ribs extend in the longitudinal direction of the shaft. Because the length of the press-fitting portion between the fitting part of the shaft and the fitting hole portion of the valve shaft part is increased, it is less likely that the shaft will be tilted relative to a longitudinal axis of the through hole of the valve shaft part. Accordingly, interference between the passage member and the valve is suppressed, and thus malfunctions of the valve such as valve locking and the like are reduced.

Namely, the object of reducing the occurrence of unexpected deformation of the valve and the shaft at the time of inserting the shaft, is attained by decreasing the press-fitting load at the time of inserting the shaft. Further, the object of reducing malfunctions of the valve is attained by restricting the shaft from being tilted relative to the longitudinal axis of the through hole of the valve shaft part.

BRIEF DESCRIPTION OF THE DRAWINGS

Other objects, features and advantages of the present invention will become more apparent from the following detailed description made with reference to the accompanying drawings, in which like parts are designated by like reference numbers and in which:

FIG. 2A is a schematic cross-sectional view of the shaft and an intake flow control valve according to the embodiment;

FIG. 2B is a cross-sectional view taken along a line IIB-IIB in FIG. 2A;

FIG. 2C is a cross-sectional view taken along a line IIC-IIC in FIG. 2A;

FIG. 2D is a cross-sectional view taken along a line IID-IID in FIG. 2A;

DETAILED DESCRIPTION OF EXEMPLARY EMBODIMENT

Figure 1A:
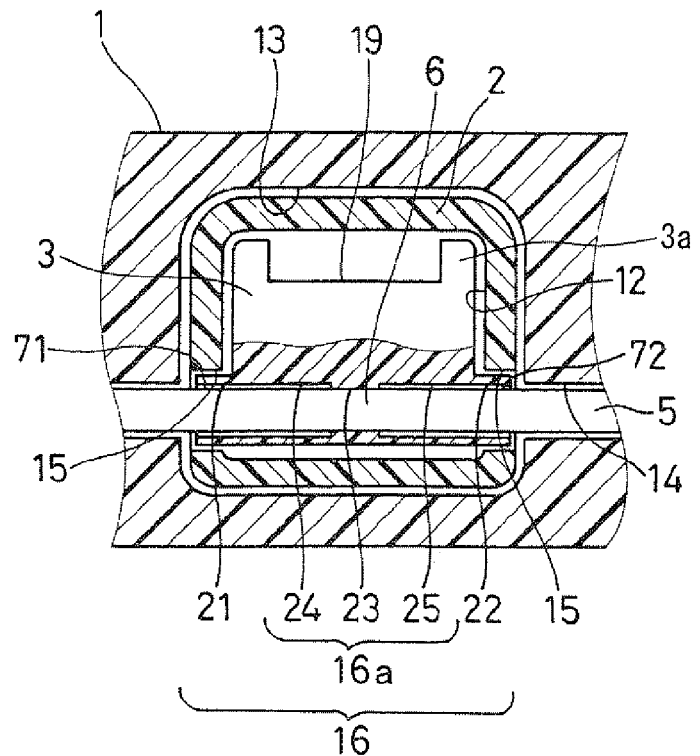
FIG. 1A is a schematic cross-sectional view of an intake vortex flow generator, taken in a direction parallel to a longitudinal axis of a shaft, according to an embodiment of the present invention.

An exemplarily embodiment of the present invention will now be described with reference to FIGS. 1A through 3D.

A passage control device of the present embodiment is, for example, an intake control device for an internal combustion engine used as an intake passage opening/closing device for opening/closing the intake passages, which are provided for feeding the intake air into the combustion chambers of the cylinders of a multi-cylinder internal combustion engine (e.g., four-cylinder gasoline engine: hereinafter referred to as engine) mounted in an engine room of a vehicle such as an automobile.

The intake control device includes a throttle controller (throttle controller for the internal combustion engine) and an intake vortex flow generator. The throttle controller is configured to control the flow rate of the intake air (intake air amount) suctioned into the combustion chamber of each cylinder of the engine. The intake vortex flow generator is configured to generate an intake vortex flow for accelerating the combustion of the mixture in the combustion chamber of each cylinder of the engine.

The intake vortex flow generator is incorporated in the intake system of the engine together with the throttle controller. For example, the intake vortex flow generator is a multiple unitary intake passage opening/closing device (valve opening/closing device) having a plurality of valve units that are arranged in fitting holes of the intake manifold 1 at predetermined intervals in a longitudinal direction of a shaft (pin rod) 5.

The engine is, for example, a water-cooled gasoline engine which produces the output from the heat energy obtained by burning, in the combustion chambers, a mixture of the clean intake air filtered through an air cleaner and the fuel injected from an injector (electromagnetic fuel injection valve). Namely, the engine employed here is a four-cycle engine that repeats the four strokes, i.e., a suction stroke, a compression stroke, an expansion (combustion) stroke and an exhaust stroke as periods (cycles). The engine includes an intake pipe for introducing the intake air into the combustion chambers of the cylinders of the engine, and an exhaust pipe for exhausting the exhaust gas from the combustion chambers of the cylinders of the engine to the exterior.

The intake pipe is a casing, such as an intake duct and intake introducing duct, forming intake passages for feeding the intake air into the combustion chambers of the cylinders of the engine. The exhaust pipe of the engine is a casing, such as an exhaust duct and exhaust discharging duct, forming exhaust passages for exhausting the exhaust gas from the combustion chambers of the cylinders of the engine to the exterior through an exhaust gas purifying device.

The engine is constituted by a cylinder head air-tightly coupled to the downstream end of the intake manifold 1, a cylinder block forming the combustion chambers relative to the cylinder head and the like. The cylinder head is provided with injectors for injecting the fuel into the intake ports of the cylinders of the engine at optimum timings.

Further, spark plugs are attached to the downstream portion of the intake manifold 1 (or the cylinder head) in a manner that the end portions thereof are exposed in the combustion chambers of the cylinders. A plurality of intake ports (suction ports) formed on one side of the cylinder head are opened and closed by poppet-type intake valves (suction valves). Further, a plurality of exhaust ports formed on the other side of the cylinder head are opened and closed by poppet-type exhaust valves.

Pistons connected to a crankshaft via connection rods are supported in the cylinder bores formed in the cylinder block so as to slide in the direction of slide thereof.

In the present embodiment, the throttle controller constitutes a system for variably controlling the amount of the air drawn into the combustion chambers of the cylinders of the engine in accordance with the throttle opening degree that corresponds to the valve opening degree of the throttle valves.

The throttle controller is constructed of a throttle body installed in the intake pipe of the engine, a butterfly-type throttle valve for varying the amount of the intake air flowing through the intake pipe (common intake passage), and a return spring (or default spring) for urging the throttle valves in a direction in which the valves close (or in a direction in which the valves open).

The throttle body is equipped with an actuator having an electric motor that drives the shaft firmly supporting the throttle valves in a direction in which the valves open (or in a direction in which the valves close). The electric motor that drives the throttle valves is current-controlled by an engine control unit (hereinafter referred to as the ECU).

Here, the intake vortex flow generator is a system that is installed in the engine room of a vehicle such as an automobile with the engine, and is capable of reducing the sectional areas of the plurality of intake passages 11 and 12 communicated with the combustion chambers of the cylinders of the engine in order to generate an intake vortex flow (tumbling flow) in the longitudinal direction in the combustion chambers of the cylinders of the engine.

The intake vortex flow generator includes an intake manifold 1, a plurality of intake flow control valves 3, a shaft 5, a single actuator and an ECU. The intake manifold 1 is coupled to the intake pipe downstream of the throttle body and the surge tank with respect to the flow of the intake air. The plurality of intake flow control valves is configured to generate tumbling flows in the combustion chambers by controlling the intake air flowing through a plurality of intake passages 11 and 12 of the intake manifold 1. Each of the intake flow control valves is also referred to as a tumble control valve, and provides a valve of a valve unit (hereinafter, referred to as the TCV). The shaft 5 passes through valve shaft parts 4 of the intake flow control valves 3. The actuator is capable of varying the valve opening degree of the plurality of TCVs at one time via the shaft 5. The ECU is adapted to control the valve opening degree of the plurality of intake flow control valves 3 in relation to the systems such as the throttle control device, ignition device and fuel injection device.

In the present embodiment, the intake manifold 1 forms an outer polygonal tubular portion of a double tubular structure. The intake manifold 1 has a coupling surface air-tightly coupled to the coupling surface of the cylinder head of the engine. An O-ring 7 is disposed between the coupling surface of the cylinder head and the coupling surface of the intake manifold 1, as an intake manifold gasket.

The intake manifold 1 forms a casing having a plurality of intake passages (branched intake passages) 11 respectively communicated with the combustion chambers of the cylinders of the engine. The intake manifold 1 has the intake passages 11 each having a square-shaped cross-section and housing-holding chambers 13 each having a square-shaped cross-section in a number corresponding to the number of the cylinders. The number of the intake passages 11 and the number of the housing-holding chambers 13 are the same as the number of the cylinders of the engine.

The intake passages 11 are correspondingly connected to the intake ports of the cylinder head. Housings 2 of the TCVs (valve units) are correspondingly fitted and held in the housing-holding chambers 13.

The intake manifold 1 has a plurality of shaft-through holes 14. The shaft 5 passes through the shaft-through holes 14 in the direction substantially perpendicular to a flow direction of the intake air of the intake passages 11, that is, perpendicular to axes of the housings 2.

The intake manifold 1 is formed with cylindrical shaft bearing portions. The ends (slide surfaces) of the shaft 5 are held in the cylindrical shaft bearing portions through bearing members. Thus, the shaft 5 is rotatable relative to the intake manifold 1.

Further, each of the TCVs includes the housing (passage member) 2 defining the intake passage (fluid passage) 12, the intake flow control valve 3 disposed in the housing 2 to control the intake passage 12, and the like.

In the present embodiment, the housing 2 and the intake flow control valve 3 constitute a cartridge of a valve unit fitted and held in the housing-holding chamber 13 of the intake manifold 1. The intake manifold 1, the plurality of housings 2 and the plurality of intake flow control valves 3 are respectively formed of a resin material, for example.

The housing 2 is held in the corresponding housing-holding chamber 13 such that the intake passage 12 of the housing 2 is in communication with the corresponding intake passage 11 and the corresponding intake port of the cylinder head. The intake passage 12 formed in the housing 2 has a square-shaped cross-section. The intake passages 12 of the housing 2 are located downstream of the intake passages 11 of the intake manifold 11 with respect to the flow of the intake air. Further, the intake passages 12 are independent from each other and are correspondingly in communication with the combustion chambers of the cylinders of the engine through the intake ports.

The housing 2 has a polygonal tubular shape having a polygonal shape in a cross-section. The housing 2 forms an inner polygonal tubular portion of the double tubular structure. The housing 2 has shaft-through holes 15 through which the shaft 5 passes through the housing 2 in the direction perpendicular to the axis of the polygonal tubular shape of the housing 2. Thus, the shaft 5 is rotatable relative to the housing 2.

Each housing 2 has a pair of right and left side walls (right and left housing walls) on opposite sides thereof in the horizontal direction (right-and-left direction in FIG. 1A) nearly at right angles with the axis of the housing 2, that is, the flow of the intake air. Further, each housing 2 has a pair of upper and lower side walls (upper and lower housing walls) on opposite sides thereof in the vertical direction (up-and-down direction in FIG. 1A) nearly at right angles with the axis of the housing, that is, the flow of the intake air.

Further, each housing 2 has two valve bearings within the right and left side walls to rotatably support both axial end portions of the intake flow control valve 3. The axial end portions of the intake flow control valve 3 provide sliding portions of a valve shaft part 4. Each of the valve bearings of the housing 2 forms the shaft-through hole 15. The shaft-through holes 15 penetrate through the right and left walls of the housing 2. The shaft 5 passes through the shaft-insertion holes 15 and is rotatable relative to the housing 2.

A gasket 8 is fitted between the inner wall surface of the housing-holding chamber 13 and the outer surface of the housing 2 in the intake manifold 1. The gasket 8 is fitted to the outer surface of the housing 8 as surrounding the outer surface of the housing 8.

Each intake flow control valve 3 is a rotary valve and has an axis of rotation in a direction perpendicular to the axis of the housing 2. The multiple intake flow control valves 3 are supported by the shaft 5 in a skewer manner. Each of the intake flow control valve 3 is movable relative to the housing 2 in a valve operation range between a fully open position where the flow rate of the intake air in the corresponding intake passage 12 is at the maximum and a fully closed position where the flow rate of the intake air in the corresponding intake passage 12 is at the minimum. That is, the intake passage 12 can be controlled by adjusting a rotational angle (valve opening degree) of the intake flow control valve 13 in the valve operation range. Namely, the passage area, such as a cross-sectional area of the intake passage 12 can be increased and reduced by adjusting the rotational angle of the intake flow control valve 13.

Here, when the engine is cold or when a small amount of the air needs to be sucked, the plurality of intake flow control valves 3 is fully closed by utilizing the driving force of an actuator and, particularly of an electric motor. That is, the plurality of TCVs are so controlled as to be placed in the fully closed state (fully closed position).

The fully closed position of the intake flow control valves 3 stands for a state where the intake flow control valves 3 are fully closed. The fully closed position is a limit position on the other side of the operation range of the intake flow control valves 3, i.e., the limit position on the fully closed side at which a full-close stopper portion of a stopper lever (not shown) fitted and fixed to an outer circumference of an axial end of the shaft 5 is in contact with a full-close stopper (not shown), limiting the intake flow control valves 3 from undergoing the fully closing operation any more.

When the engine is in the middle- to high-speed rotational region or in the middle- to high-load region, the plurality of intake flow control valves 3 is fully opened by utilizing the driving force of the electric motor. That is, the plurality of TCVs are so controlled as to be placed in the fully opened state (fully opened position).

The fully opened position of the intake flow control valves 3 stands for a state where the intake flow control valves 3 are fully opened. The fully opened position is a limit position on the one side of the operation range of the intake flow control valves 3, i.e., the limit position on the fully opened side at which a full-open stopper portion of the stopper lever (not shown) is in contact with a full-open stopper (not shown), limiting the intake flow control valves 3 from undergoing the fully opening operation any more.

When the operation of the engine is discontinued and no electric power is supplied to the electric motor, the plurality of intake flow control valves 3 is returned to the fully opened position or an intermediate position (intermediate opening degree) slightly closed from the fully opened position due to the urging force of, for example, springs.

In the present embodiment, the shaft 5 passes through the multiple intake flow control valves 3 in a skewer manner. That is, the intake flow control valves 3 are movable together through a single drive shaft 5. Further, the opening degrees of the plurality of intake flow control valves 3 are varied by the shaft 5.

The shaft 5 of the present embodiment has at least one axial end protruding outward beyond the side surface of the intake manifold 1 passing through the shaft-through hole 15 of the housing 2 and the shaft-through hole 14 of the intake manifold 1. A cylindrical joint shaft (not shown) is fitted to the outer circumference of the protruding axial end the shaft 5. The joint shaft works to couple a final reduction gear of the actuator and the stopper lever holding and fixing the final reduction gear to the shaft 5. The intake flow control valves 3 and the shaft 5 will be described later in detail.

The actuator of the present embodiment has an electric motor (not shown) that is supplied with the electric power to produce a driving force, and a power transmission mechanism for transmitting the driving force of the electric motor to the shaft 5.

The power transmission mechanism is constituted by a gear reduction mechanism which reduces the rotational speed of the electric motor at a predetermined reduction ratio and increases the driving force (motor torque) of the electric motor. The gear reduction mechanism has a motor gear fixed to the motor shaft of the electric motor, an intermediate reduction gear in mesh with the motor gear, and the final reduction gear in mesh with the intermediate reduction gear. Here, the shaft 5 or the final reduction gear may be provided with a spring which urges all of the intake flow control valves 3 in a direction in which the valves open or in a direction in which the valves close.

The electric motor that drives the plurality of intake flow control valves 3 through the shaft 5 is controlled (driven) by the ECU. The ECU is provided with a microcomputer of a known structure that includes such functions as a CPU for executing control processing and operation processing, a storage unit (ROM or RAM) for storing control programs, control logics and various data, an input circuit (input unit), an output circuit (output unit), a power source circuit, a timer and the like functions.

When the ignition switch is turned on (IG-ON), the ECU controls control the electric motor of the throttle controller and the electric motor of the intake vortex flow generator based on the control program or control logic stored in the memory and, further, drives the fuel injection device (electric fuel pump, injector, etc.) and the ignition device (ignition coil, spark plugs, etc.). While the engine is in operation, therefore, the intake air amount, opening degree of TCVs and fuel injection amount are so controlled as to assume controlled instruction values (controlled target values).

When the ignition switch is turned off (IG-OFF), further, the ECU forcibly ends the engine control inclusive of the fuel injection control and the ignition control based on the control program or control logic stored in the memory.

The ECU, further, inputs the sensor signals from various sensors such as crank angle sensor, accelerator opening degree sensor, throttle opening degree sensor valve opening degree sensor, cooling water temperature sensor, air flow meter and exhaust gas sensor to the microcomputer after they have been put to the A/D conversion through A/D converters.

Figure 1B:
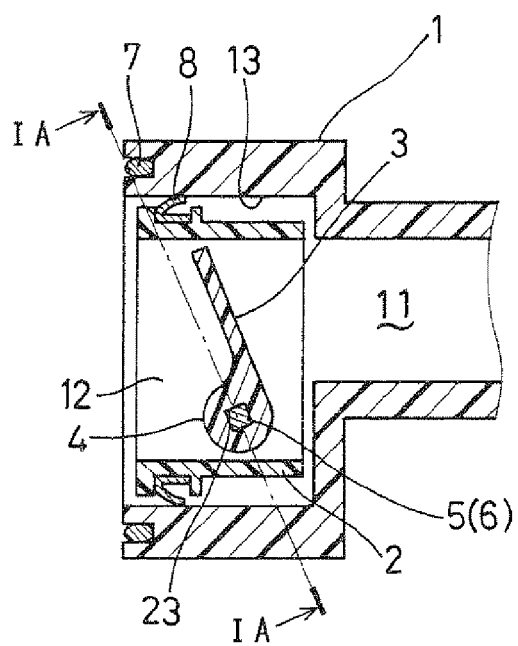
FIG. 1B is a schematic cross-sectional view of the intake vortex flow generator, defined in a direction perpendicular to the longitudinal axis of the shaft, according to the embodiment.

Next, the intake flow control valve 3 of each valve unit will be described in detail with reference to FIGS. 1 to 3.

The intake flow control valve 3 has a valve shaft part 4 forming a shaft-through hole 16 into which the shaft 5 is inserted. In other words, the valve shaft part 4 is formed to surround a periphery of the shaft-through hole 16. The valve shaft part 4 is integrally formed with a valve body part 3a of the intake flow control valve 3. Axial ends of the valve shaft part 4 are held in the shaft-through holes 15 of the housing 2, and thus the intake flow control valve 3 is rotatable relative to the housing 2. The valve shaft part 4 has a generally cylindrical outer shape and forms a through hole therein as the shaft-through hole 16.

The valve shaft part 4 is, for example, formed at one end of the valve body part 3a. The valve body part 3a has a cutout or notch portion at a middle portion of the other end, such as an upper end in FIG. 1A. The notch portion provides a rectangular opening 19 for causing the air drawn into the combustion chamber of the cylinder of the engine to create an intake vortex flow (tumbling flow). However, the opening 19 is not always necessary. Alternatively or in addition to the opening 19, the valve body part 3a of the intake flow control valve 3 may have notch portion on sides, such as right and left sides in FIG. 1A, to form sub-openings having opening areas smaller than that of the opening (main opening) 19.

The valve shaft part 4 of each intake flow control valve 3 includes shaft non-press-insertion portions (non-fitting hole portions) each defining a hole therein with an inner diameter larger than the outer diameter of the shaft 5, and a shaft press-insertion portion (fitting hole portion) 16a defining a hole therein for holding and fixing a fitting part 6 of the shaft 5 therein.

The shaft non-press-insertion portions are formed at the axial ends of the valve shaft part 4, which protrudes from the right and left sides of the valve body part 3a and are located in the shaft-through holes 15 of the housing 2 to form slide portions of the valve shaft part 4. The shaft non-press-insertion portions each has a substantially tubular shape. The shaft non-press-insertion portions form first and second insertion holes 21, 22 therein.

The first and second insertion holes 21, 22 each has a circular shape in a cross-section defined in a direction perpendicular to an axis of the shaft-through hole 16 and has an inner diameter larger than the outer diameter of the shaft 5. That is, the shaft-through hole 16 includes the first and second circular insertion holes 21, 22. Here, the first insertion hole 21 is formed on the left side of the fitting hole portion 16a in FIG. 1A, and the second insertion hole 22 is formed on the right side of the fitting hole portion 16a in FIG. 1A. Hereinafter, the first and second insertion holes 21, 22 are also referred to as the left and right insertion holes 21, 22, respectively.

The fitting hole portion 16a is provided in an area between the right and left side surfaces of the valve body part 3a of the intake flow control valve 3. That is, the fitting hole portion 16a is formed in the shaft-through hole 16 entirely over a width corresponding to the width of the valve body part 3a of the intake flow control valve 3. In other words, the shaft press-insertion portion is formed over the shaft-through hole 16 except the two slide portions. The shaft press-insertion portion is provided between the shaft non-press-insertion portions.

Inside of the fitting hole portion 16a, a square central press-insertion hole 23 and square first and second press-insertion holes 24, 25 are formed. The first and second press-insertion holes 24, 25 are formed on opposite sides of the square press-insertion hole 23. That is, the shaft-through hole 16 includes the fitting hole portion 16a having the central press-insertion hole 23 and the first and second press-insertion holes 24, 25. The central press-insertion hole 23 has a square-shaped cross-section with a dimension (e.g., diameter) smaller than the outer dimension (e.g., outer diameter) of the fitting part 6 of the shaft 5. Thus, the fitting part 6 of the shaft 5 is press-fitted in the central press-insertion hole 23. The first and second press-insertion holes 24, 25 each has a square-shaped cross-section.

The central press-insertion hole 23 and the first and second press-insertion holes 24 and 25 are provided by at least four wall surfaces, that is, first to fourth wall surfaces (first to fourth walls). That is, the fitting hole portion 16a is provided by at least the first to fourth wall surfaces. The two neighboring wall surfaces form an arcuate or rounded corner portion between them. Alternatively, the two neighboring wall surfaces form a right angled-corner portion between them. In this case, the neighboring two wall surfaces intersect with each other at a substantially right angle.

The fitting part 6 of the shaft 5 has a substantially square shape in a cross-section defined in a direction perpendicular to the axis of the fitting part 6. The fitting part 6 includes at least first to fourth flat surface portions (first to fourth shaft surfaces) 61 to 64. The two neighboring flat surface portions 61 to 64 intersect each other at a substantially right angle.

The first to fourth wall surfaces of the fitting hole portion 16a respectively have first to fourth central protuberances 31 to 34 to form the central press-insertion hole 23. The first and second central protuberances 31 and 32 are formed on the first and second wall surfaces of the fitting hole portion 16a facing the first and second flat surface portions 61, 62 of the fitting part 16 of the shaft 5. The first and second central protuberances 31 and 32 protrude or rise from base planes of the first and second wall surfaces toward the fitting part 6 of the shaft 5. The first and second central protuberances 31, 32 have top surfaces which are flattened at the same height as the top surfaces of a plurality of first to fourth protruded ribs 41 to 44, which will be described later. That is, the top surfaces of the first and second central protuberances 31, 32 are coplanar with the top surfaces of the first to fourth protruded ribs 41 to 44.

The third and fourth central protuberances 33 and 34 are formed on the third and fourth wall surfaces of the fitting hole portion 16a facing the third and fourth flat surface portions 63, 64 of the fitting part 6 of the shaft 5. The third and fourth central protuberances 33 and 34 protrude or rise from base planes of the third and fourth wall surfaces toward the fitting part 6 of the shaft 5. The third and fourth central protuberances 33 and 34 have flat top surfaces.

Dimensions (e.g., inner diameters) of axial ends of the first and second press-insertion holes 24, 25 are gradually expanded toward the first and second insertion holes 21, 22. Thus, the first and second press-insertion holes 24, 25 form expanding portions 27 and 28. Thus, the shaft 5 can be smoothly inserted in the central press-insertion hole 23 and the first and second press-insertion holes 24, 25 in the axial direction of the shaft-through hole 16.

The first and second wall surfaces of the fitting hole portion 16a have first to fourth protruded ribs 41 to 44 on opposite sides of the first and second central protuberances 31, 32 to form the first and second press-insertion holes 24, 25. The first to fourth protruded ribs 41 to 44 extend in the axial direction of the shaft-through hole 16.

The first to fourth protruded ribs 41 to 44 are formed as stripes to protrude from the base planes of the first and second wall surfaces so as to have contact surfaces contacting the first and second flat surface portions 61, 62 of the fitting part 6 of the shaft 5. The first to fourth protruded ribs 41 to 44 are arranged parallel to each other at predetermined intervals in a direction perpendicular to the axial direction of the shaft-through hole 6. Specifically, two ribs are formed on the first wall surface as the first protruded ribs 41, and two ribs are formed on the first wall surface as the third protruded ribs 43. Two ribs are formed on the second wall surface as the second protruded ribs 42, and two ribs are formed on the second wall surface as the fourth protruded ribs 44.

Each rib protrudes from the base plane of the first or second wall surface with a rectangular parallelepiped shape and has a longitudinal axis parallel to the axial direction of the shaft-through hole 6.

The first protruded ribs 41 are provided on the first wall surface of the shaft-through hole 16 on one side of the first central protuberance 31, such as on a left side in FIG. 38. The second protruded ribs 42 are provided on the second wall surface of the shaft-through hole 16 on one side of the second central protuberance 32, such as on a left side in FIG. 3B. The third protruded ribs 43 are provided on the first wall surface of the shaft-through hole 16 of the valve shaft part 4 on the other side of the first central protuberance 31, such as on a right side in FIG. 3B. Further, the fourth protruded ribs 44 are provided on the second wall surface of the shaft-through hole 16 of the valve shaft part 4 on the other side of the second central protuberance 32, such as on a right side in FIG. 3B.

The third wall surface of the fitting hole portion 16a includes first and third inner flat surfaces (flat portions) 51, 53 on opposite sides of the third central protuberance 33. The fourth wall surface of the shaft-through hole 16 includes second and fourth inner flat surfaces (flat portions) 52, 54 on opposite sides of the fourth central protuberance 34. The first to fourth inner flat surface portions 51 to 54 are flat and extend in the axial direction of the shaft-through hole 16. The first to fourth inner flat surface portions 51 to 54 are spaced from the third and fourth two flat surface portions 63 and 64 of the fitting part 6 of the shaft 5 to provide predetermined gaps.

Figure 3A:
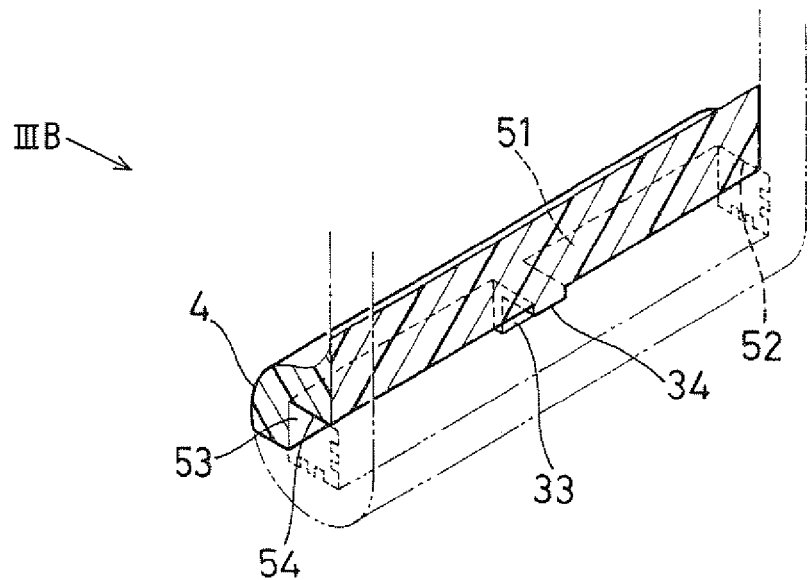
FIG. 3A is a schematic perspective view of a valve shaft part of the intake flow control valve according to the embodiment.
Figure 3B:
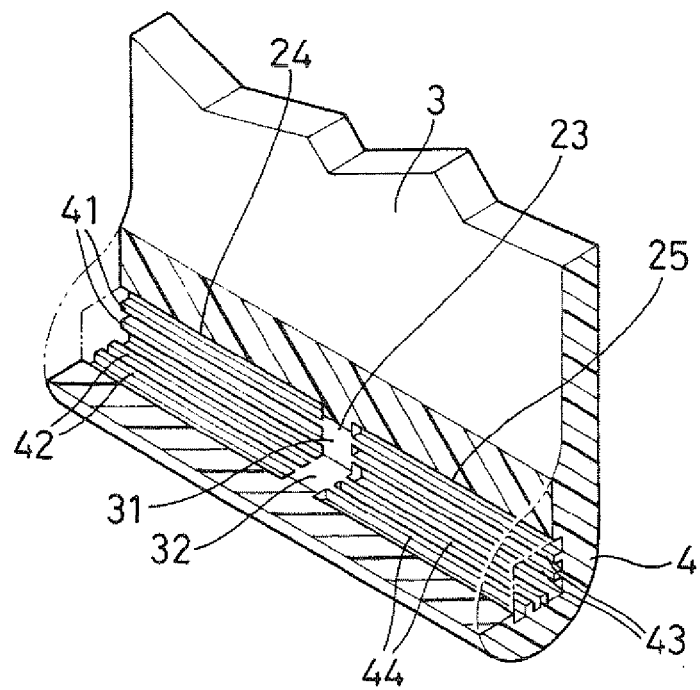
FIG. 3B is a schematic perspective view of the valve shaft part of the intake flow control valve when viewed along an arrow IIIB in FIG. 3A.
Figure 4A:
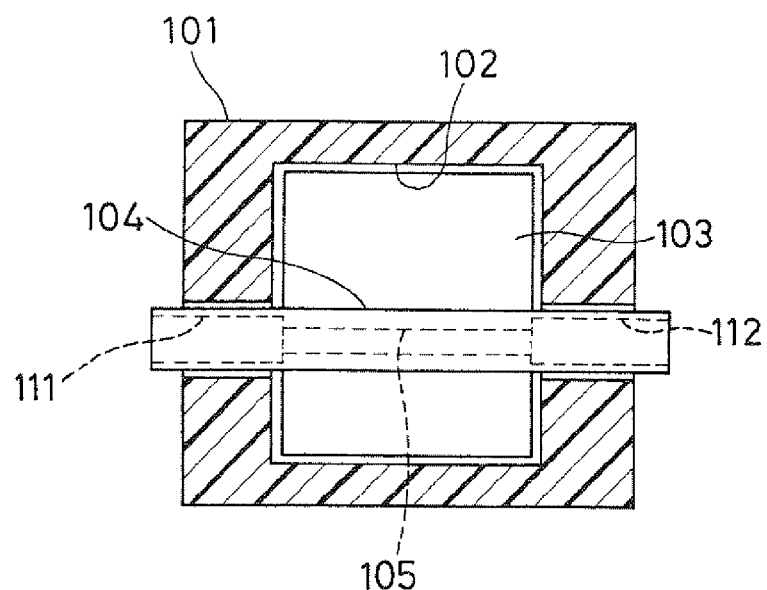
FIGS. 4A and 4B are cross-sectional views of a valve unit of a prior art.
Figure 4B:
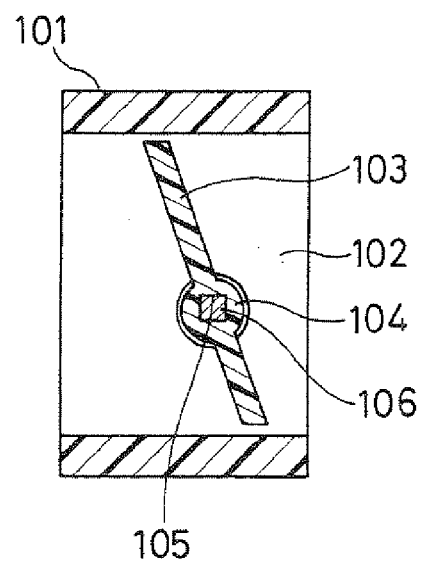

The first inner flat surface portion 51 is formed on the third wall surface of the fitting hole portion 16a of the valve shaft part 4 on the one side of the third central protuberance 33, such as on the right side in FIG. 3A. The second inner flat surface portion 52 is formed on the fourth wall surface of the fitting hole portion 16a on the one side of the fourth central protuberance 34, such as on the right side in FIG. 3. The third inner flat surface portion 53 is formed on the third wall surface of fitting hole portion 16a on the other side of the third central protuberance 33, such as on the left side in FIG. 3A. The fourth inner flat surface portion 54 is formed on the fourth wall surface of the fitting hole portion 16a on the other side of the fourth central protuberance 34, such as on the left side in FIG. 3A.

Next, the shaft 5 of the present embodiment will be described in detail with reference to FIGS. 1A through 2D.

The shaft 5 is a generally polygonal shaft (square steel shaft) having a polygonal shape (e.g., square shape) in a cross section defined perpendicular to a longitudinal direction thereof. The shaft 5 is formed of a metal material, for example. The shaft 5 passes through the shaft-through holes 16 of the valve shaft parts 4. Particularly, the shaft 5 is held and fixed by the fitting hole portions 16a provided by the central press-insertion hole 23 and the first and second press-insertion holes 24, 25 by press-fitting.

The shaft 5 has the plurality of fitting parts 6 fitted in the fitting hole portions 16a of the intake flow control valves 3. Each fitting part 6 of the shaft 5 has a polygonal shape (e.g., square shape) having at least the four flat surface portions, such as the first to fourth flat surface portions 61 to 64, and is held in the central press-insertion holes 23 and the wall surfaces of the first and second press-insertion holes 24 and 25. For example, the fitting part 6 has a square shape in a cross section defined perpendicular to the longitudinal direction of the shaft 5.

The shaft 5 has first and second outer diameter portions (right and left outer diameter portions) 71, 72 at axial ends of the fitting part 6. The first and second outer diameter portions 71, 72 each have an outer diameter smaller than the diameter of the first and second insertion holes 21 and 22 of the shaft-through hole 16. The first and second outer diameter portions 71 and 72 each have a circular shape in a cross section defined perpendicular to the longitudinal direction of the shaft 5.

Further, the first and second outer diameter portions 71, 72 of the shaft 5 each provide a cylindrical gap relative to the wall surfaces of the first and second insertion holes 21 and 22. That is, the first and second outer diameter portions 71, 72 of the shaft 5 are loosely fitted in the first and second insertion holes 21, 22.

The two neighboring flat surface portions 61 to 64 of the fitting part 6 form an arcuate or rounded corner between them. Alternatively, the two neighboring flat surface portions 61 to 64 form a right-angled corner between them. In this case, the neighboring two flat surface portions intersect each other nearly at a right angle.

[Operation]

Next, an operation of the intake vortex flow generator of the present embodiment will be briefly described with reference to FIGS. 1A through 3B.

When the ignition switch is turned on (IG-ON), the ECU controls the supply of electric current to the electric motor that drives the throttle valve, and drives the fuel injection device (electric fuel pump, injector, etc.) and the ignition device (ignition coil, spark plugs, etc.). Thus, the engine is operated.

Here, if a particular cylinder of the engine shifts from the exhaust stroke to the intake stroke in which the intake valve opens and the piston moves down, the negative pressure (pressure lower than the atmospheric pressure) increases in the combustion chamber of the cylinder accompanying the downward motion of the piston, and the mixture is taken into the combustion chamber through the intake port that is opened.

Further, when the engine is hot and the air must be sucked in large amounts, i.e., when the engine is in the middle- to high-speed rotational region or in the middle- to high-load region, the ECU controls the supply of electric power to the electric motor that drives the plurality of intake air flow control valves 3 (e.g., feeds electric current to the electric motor).

The driving force of the electric motor is transmitted to the motor gear, intermediate reduction gear and final reduction gear in the gear reduction mechanism and is, further, transmitted to the shaft 5 from the stopper lever that is insert-formed in the inner circumferential portion of the final reduction gear through the joint shaft.

Therefore, the plurality of intake flow control valves 3 coupled to the shaft 5 in a skewed manner are driven by the driving force of the electric motor in a direction in which they open.

In this embodiment, the stopper lever is provided with a full-open stopper portion. Therefore, if the final reduction gear rotates in a direction in which the valves open by utilizing the driving force of the electric motor, the stopper lever, too, rotates in the direction in which the valves open. If the full-open stopper portion of the stopper lever comes in contact with the full-open stopper, the TCVs are limited so as to be placed in a state where they are fully opened at the full-open position.

In this case, the intake air flows from the plurality of intake passages 11 of the engine intake manifold 1 into the intake passages 12 formed in the plurality of housings 2 through the inlets of housings 2 of the TCVs, passes straight through the plurality of intake passages 12, and is introduced into the intake ports of the cylinder head of the engine from the outlets of the plurality of housings 2. The intake air that has passed through the intake ports is fed into the combustion chambers through the intake valve ports of the intake ports. Here, no intake vortex (tumbling flow) occurs in the longitudinal direction in the combustion chambers of the cylinders of the engine.

When the engine is cold and the intake air amount is small, i.e., at the start of the engine or when the engine is in idling operation, on the other hand, the ECU controls the electric power supplied to the electric motor that drives the plurality of intake flow control valves 3 (e.g., current-carrying of the electric motor).

Therefore, the intake flow control valves 3 are closed being driven by the driving force of the electric motor in the direction in which the valves close.

Here, in this embodiment, the stopper lever is provided with the full-close stopper portion. Therefore, if the final reduction gear rotates in a direction in which the valves close by utilizing the driving force of the electric motor, the stopper lever, too, rotates in the direction in which the valves close. It the full-close stopper portion of the stopper lever comes in contact with the full-close stopper, the TCVs are limited so as to be placed in a state where they are fully closed at the full-close position.

In this case, the intake air flows from the plurality of intake passages 11 of the engine intake manifold 1 into the intake passages 12 through the inlets of the plurality of housings 2, passes almost all through the gaps (opening portions 19) between the passage wall surfaces of upper walls of the housings 2 and the upper end surfaces of the intake flow control valves 3, and is introduced into the upper layer portions in the intake ports from the outlets of the plurality of housings 2 so as to flow along the top wall surfaces in the upper layer portions of the intake ports. The intake air that has flown along the top wall surfaces in the upper layer portions of the intake ports is fed into the combustion chambers through the intake valve ports of the intake ports. Here, a tumbling flow occurs in the combustion chambers of the cylinders of the engine contributing to improving the combustion efficiency in the combustion chambers at the start of the engine or when the engine is in idling operation and to improving the fuel efficiency and emission (e.g., decreasing HC).

[Effects]

In the intake vortex flow generator of the present embodiment as described above, the shaft 5 passes through the shaft-through holes 16 of the valve shafts 4 of the intake flow control valves 3 to support the intake flow control valves 3. In assembling, the shaft 5 is inserted into the shaft-through holes 16 of the intake flow control valves 3. At this time, the first to fourth flat surface portions 61, to 64 of the fitting part 6 of the shaft 5 are force-fitted in the fitting hole portion 16a provided by the neighboring first and second wall surfaces and the neighboring third and fourth wall surfaces.

As shown in FIGS. 1A through 2D, the first flat surface portion (first outer flat surface portion) 61 of the fitting part 6 comes in contact with the top surface (flat surface) of the first central protuberance 31 and the top surfaces of the first and third protruded ribs 41, 43. Further, the first flat surface portion 61 is pressed in contact with and fixed to the first wall surface of the fitting hole portion 16a provided by the wall surfaces of the central press-insertion hole 23 and the first and second press-insertion holes 24, 25.

Likewise, the second flat surface portion (second outer flat surface portion) 62 of the fitting part 6 comes in contact with the top surface (flat surface) of the second central protuberance 32 and the top surfaces of the plurality of second and fourth protruded ribs 42, 44. Further, the second flat surface portion is pressed in contact with and fixed to the second wall surface of the fitting hole portion 16a, that is, wall surfaces of the central press-insertion hole 23 and of the right and left press-insertion holes 24, 25.

The third flat surface portion (third outer flat surface portion) 63 of the fitting part 6 comes in contact with the top surface (flat surface) of the third central protuberance 33. The third flat surface portion 63 is pressed in contact with and fixed to the third wall surface of the fitting hole portion 16a, that is, the wall surface of the central press-insertion hole 23. Here, the third flat surface portion 63 is opposed to the first and third inner flat surface portions 51, 53 across the predetermined gaps, as shown in FIGS. 2B and 2D. As such, the press-fitting load when press-fitting the shaft 5 is reduced.

Likewise, the fourth flat surface portion (fourth outer flat surface portion) 64 of the fitting part 6 comes in contact with the top surface (flat surface) of the fourth central protuberance 34. The fourth flat surface portion 64 is pressed in contact with and fixed to the fourth wall surface of the fitting hole portion 16a, that is, the wall surface of the central press-insertion hole 23. Here, the fourth flat surface portion 64 is opposed to the second and fourth inner flat surface portions 52, 54 across the predetermined gaps, as shown in FIGS. 2B and 2D. As such, the press-fitting load when press-fitting the shaft 5 is reduced.

When a press-insertion margin (press-fitting margin) of the fitting hole portion 16a is large and when the surface pressure of the contact portions between the first to fourth wall surfaces of the fitting hole portion 11a (i.e., top surfaces of the first to fourth central protuberances 31 to 34 and top surfaces of the first to fourth protruded ribs 41 to 44) and the first to fourth flat surface portions 61 to 64 of the fitting part 6 of the shaft 5 is large, the ends of the third and fourth central protuberances 33, 34 and the ends of the first to fourth protruded ribs 41 to 44 are so deformed as to be crushed. Therefore, an increase in the surface pressure at the contact portions between the first to fourth wall surfaces of the fitting hole portion 16a of the valve shaft part 4 and the first to fourth flat surface portions 61 to 64 of the fitting part 6 is suppressed. This makes it possible to decrease the press-insertion load at the time of press-fitting the shaft 5 and, therefore, to suppress the occurrence of inconveniences such as unexpected deformation of the valve shaft part 4 and deformation or cracking of the shaft 5. Therefore, durability of the TCVs (valve units) improves.

In the intake vortex flow generator of the present embodiment, further, the first to fourth protruded ribs 41 to 44 are formed on the wall surfaces, particularly, on the neighboring first and second wall surfaces of the press-insertion holes 24, 25. The first to fourth protruded ribs 41 to 44 extend in the axial direction of the shaft 5.

As such, the length of the press-fitting portion between the fitting part 6 and the shaft valve part 4, that is, between the top surfaces of the first to fourth protruded ribs 41 to 44 of the first and second press-insertion holes 24, 25 and the first and second flat surface portions 61, 62 of the fitting part 6 of the shaft 5 is increased in the axial direction of the shaft 5. Therefore, it is less likely that the shaft 5 will be tilted relative to the longitudinal axis of the shaft-through hole 16 when being inserted in the shaft-through hole 16. Accordingly, the interference between the housing 2 and the intake flow control valve 3 is reduced, and therefore the occurrence of inconveniences such as malfunction or locking of the intake flow control valve 3 is suppressed.

(Modifications)

In the above embodiment, the intake vortex flow generator is so constituted as to form an intake vortex (tumbling flow) in the longitudinal direction for facilitating the combustion of the mixture in the combustion chamber of each cylinder of the engine. However, the intake vortex flow generator may be so constituted as to form an intake vortex (swirling flow) in the transverse direction to facilitate the combustion of the mixture in the combustion chamber of each cylinder of the engine. Further, the intake vortex flow generator may be so constituted as to form a squish vortex for facilitating the combustion of the engine.

In the above embodiment, the actuator for driving the intake flow control valves 3 through the shaft 5 is constructed by using an electric motor and a power transmission mechanism (e.g., gear reduction mechanism, etc.). Alternatively, the actuator for driving the shaft 5 can be constructed by using the electric motor only. Further, valve-urging means such as springs for urging the intake flow control valves 3 in the opening direction or in the closing direction are not always necessary.

In the above embodiment, the present invention is exemplarily employed to the TCVs of the intake vortex flow generator for the internal combustion engine. However, the present invention can be employed to any other passage control devices having a passage member (e.g., casing, housing, duct) that forms fluid passage through which a fluid flows and a valve disposed in the passage member to control the fluid passage.

For example, the present invention can be employed to a throttle controller or an intake-varying device which varies the passage length or the sectional passage areas of the intake passages of the internal combustion engine.

In place of the TCVs, the passage control device can be one of an intake flow rate control device having throttle valves disposed in intake passages formed in a throttle body for controlling a flow rate of the intake air to be introduced in the combustion chamber of the engine, and an intake flow rate control device having idling rotational speed control valves disposed in the intake passages formed in the housing to control the flow rate of the intake air bypassing the throttle valves.

As further examples, the passage control device can be any one of an intake passage opening/closing device, an intake passage switching device, and an intake pressure control device. Further, the passage control device can be the intake flow control device such as the tumbling flow control valve as the above embodiment or the swirling flow control device, or an intake-varying device that varies the passage length or the sectional passage areas of the intake passages of the internal combustion engine. Moreover, the internal combustion engine can be a diesel engine. The internal combustion engine is not limited to a multi-cylinder engine, but can be a single-cylinder engine.

In the above embodiment, a multiple unitary valve opening/closing device (intake passage opening/closing device) is exemplarily employed. In the multiple unitary valve opening/closing device, the valve units (cartridges), each having the housing 2 defining the intake passage 12 as the passage member and the intake flow control valve 3 disposed the housing 2 to control the intake passage 12, are correspondingly arranged in the intake manifold 1 at predetermined intervals in the longitudinal direction of the shaft 5. Alternatively, the intake control valves 3 can be directly arranged in a passage member such as a casing, another intake pipe, an engine head cover, a cylinder head. In such a case, the housings 2 can be eliminated.

The valves driven by the actuator (particularly, gears) constituted by the electric motor and the power transmission mechanism (gear reduction mechanism) are not limited to the intake control valves 3 of the multiple unitary valve opening/closing device, but can be any valves disposed in intake air passages communicating with the engine. Further, the present invention may be employed to a passage control device having a single valve.

In the above embodiment, the central press-insertion hole 23 and the first and second press-insertion holes 24, 25 each has the square shape in cross-section. However, the cross-sectional shape of the central press-insertion hole 23 and the first and second press-insertion holes 24, 25 is not limited to the square shape, but can be any other polygonal shape having more than four sides.

In the above embodiment, the fitting part 6 has the polygonal shape having at leas four sides. The fitting part 6 may have any other polygonal shape having more than four sides.

Further, the first and second central protuberances 31 and 32 may not be formed. In this case, the protruded ribs 41 to 44 are formed to extend entirely over the first and second wall surfaces of the press-insertion hole in the axial direction.

In the above embodiment, the first to fourth protruded ribs 41 to 44 are formed in the first and second wall surfaces on both sides of the central press-insertion hole 23. However, the protruded ribs may be formed on the first and second two wall surfaces only on one side of the central press-insertion hole 23.

Additional advantages and modifications will readily occur to those skilled in the art. The invention in its broader term is therefore not limited to the specific details, representative apparatus, and illustrative examples shown and described.

What is claimed is:

1. An intake control device for an internal combustion engine comprising:
  (a) a housing having an intake passage communicated with a combustion chamber of the internal combustion engine;
  (b) a valve housed in the housing for opening and closing the intake passage; and
  (c) a shaft for varying an opening degree of the valve, wherein:
  the valve has a through hole in which the shaft is inserted to penetrate through in an axial direction of rotation thereof, and a tubular valve shaft part so arranged as to surround a periphery of the through hole;
  the through hole includes a fitting hole formed in a polygonal shape in which the shaft is press-fitted;
  the shaft includes a fitting part having a polygonal shape including at least four flat surface portions, the fitting part being fitted to and held on wall surfaces of the fitting hole through the four flat surface portions; and
  the through hole has protruded ribs on first and second two wall surfaces of the fitting hole opposed to the neighboring first and second two flat surface portions of the four flat surface portions of the shaft, the protruded ribs extending in the axial direction of rotation of the shaft, and has flat surface portions formed on third and fourth two wall surfaces of the fitting hole opposed to the neighboring third and fourth two flat surface portions of the four flat surface portions of the shaft, the flat surface portions extending in the axial direction of rotation of the shaft.

2. The intake control device for an internal combustion engine according to claim 1, wherein the protruded ribs are protruded from the first and second two wall surfaces of the fitting hole so as to come in contact with the first and second two flat surface portions.

3. The intake control device for an internal combustion engine according to claim 1, wherein the protruded ribs are arranged in parallel at predetermined intervals in an inner circumferential direction of the first and second two wall surfaces of fitting hole.

4. The intake control device for an internal combustion engine according to claim 1, wherein:
  the through hole has protuberances formed on the first and second two wall surfaces of the fitting hole and protruding toward the fitting portion of the shaft;
  the protuberances have top surfaces which are at the same height as that of top surfaces of the protruded ribs; and
  the protruded ribs are formed on one side of the protuberances.

5. The intake control device for an internal combustion engine according to claim 1, wherein:
  the through hole has protuberances formed on the first and second two wall surfaces of the fitting hole and protruding toward the fitting portion of the shaft;
  the protuberances have top surfaces which are at the same height as that of top surfaces of the protruded ribs; and
  the protruded ribs are formed on both sides of the protuberances.

6. The intake control device for an internal combustion engine according to claim 1, wherein:
   the through holes have protuberances formed on the third and fourth two wall surfaces of the fitting hole and protruding or rising toward the fitting portion of the shaft;
   the protuberances have top surfaces which are flattened; and
   the flat surface portions of the through holes are formed on both sides of the protuberances.

7. The intake control device for an internal combustion engine according to claim 1, wherein the flat surface portions of the through holes form gaps between themselves and the third and fourth two flat surface portions.

8. The intake control device for an internal combustion engine according to claim 1, wherein the valve shaft part is formed in a cylindrical shape in cross section perpendicular to the axial direction of rotation thereof.

9. The intake control device for an internal combustion engine according to claim 1, wherein the shaft is formed in a square shape in cross section perpendicular to the axial direction of rotation thereof.

10. The intake control device for an internal combustion engine according to claim 1, wherein the fitting hole is chamfered at corners that are formed between the neighboring wall surfaces of the fitting hole.

* * * * *